Patented Aug. 9, 1938

2,126,520

UNITED STATES PATENT OFFICE 2,126,520

ADHESIVE FOR LABELS AND METHOD OF MAKING SAME

Louis K. Wakeman, Leonia, N. J., assignor to International Patents Development Company, Wilmington, Del., a corporation of Delaware No Drawing. Application February 1, 1936, Serial No. 61,892

12 Claims. (Cl. 134—23.4)

This invention relates to the production of adhesives, and its primary object is to provide an adhesive paste suitable for varnished carton labels, the paper of which as it comes from the printer is permeated, more or less, with oil. Under these or similar conditions, the effective pasting of the label, or other paper, to the carton or other object to which the paper is affixed, for example by means of automatic wrapping machinery, is attended with considerable difficulties where ordinary pastes are used, due to the oily condition of the labels. When the paste dries, the label is likely to crack off. The paste of the present invention provides a very much more efficient bond under these or similar conditions.

The paste is made by blending tapioca dextrine, having the characteristics substantially as hereinafter set forth, and made by a dry roasting process, with borax and a hygroscopic agent such as diethylene glycol, and cooking the mixture with sufficient water to form a thick paste.

The dextrine is made, preferably, in the following manner: Santo Domingo tapioca starch grade A is dried to a moisture content of 5% to 6% and is acidified, preferably with hydrochloric acid to a pH of approximately 3.5. The acidified starch is converted to dextrine in the usual dextrine cooker provided with an agitator. The temperature of the starch is gradually raised to 250° Fahrenheit in 8 hours and is held at that temperature for from 15 to 18 hours. The dextrine thus produced will be white in color with a solubility of between 28% and 35%, a dextrose content of less than 3%, and a fluidity measured by the Corn Products Refining Company's fluidity funnel of from 23 to 26; employing the method described by Hambden Buel in Original Communications: Eighth International Congress of Applied Chemistry, Vol. XIII, page 63, except that the rate of agitation is now 200 revolutions per minute instead of 70-80 revolutions.

1000 pounds of dextrine having the above characteristics, and preferably produced substantially as described, are blended with 121 pounds of borax and 22 pounds of dry diethylene glycol or other suitable hygroscopic substance.

In making the glue or paste, one part, by weight, of this mixture is cooked with, for example, 2¾ parts of water at a temperature of about 200° Fahrenheit for about 15 minutes. Water is added to make up for evaporation loss. The paste may be spread on the labels in the customary manner, either by hand or, as will be more frequently the case, automatically by means of wrapping or labelling machines. The amount of water used in making the paste will differ, depending upon the types of labels and labelling machines in connection with which the paste is used.

It is the intention to cover by patent all modifications of product and process within the scope of the appended claims.

I claim:

1. Compound for making an adhesive paste which when cooked with water is capable of adhering to an oily surface composed of tapioca dextrine having characteristics substantially as follows: solubility 28%–35%, dextrose content under 3% and fluidity 23–26; in an intimate mixture with borax and a hygroscopic agent.

2. Adhesive paste capable of adhering to an oily surface composed of tapioca dextrine having characteristics substantially as follows: solubility 28%–35%, dextrose content under 3% and fluidity 23–26; and containing borax, a hygroscopic agent and water.

3. Adhesive paste capable of adhering to an oily surface composed of tapioca dextrine having characteristics substantially as follows: solubility 28%–35%, dextrose content under 3% and fluidity 23–26; and containing borax, diethylene glycol and water.

4. A compound for making an adhesive paste which when cooked with water is capable of adhering to an oily surface composed of tapioca dextrine having characteristics substantially as follows: solubility 28%–35%, dextrose content under 3% and fluidity 23–26; in an intimate mixture with borax and diethylene glycol.

5. Method of making the herein described compound for forming a paste adherent to oil permeated paper which comprises dextrinizing by a dry roasting process tapioca starch acidified to about pH equals 3.5 by heating at about 250° Fahrenheit for approximately 15 to 18 hours; and blending the resultant dextrine with borax and a hygroscopic substance.

6. Method of making the herein described paste adherent to oil permeated paper which comprises heating dried tapioca starch acidified to about pH equals 3.5 at 250° Fahrenheit for 15 to 18 hours; blending the resultant dextrine with borax and a hygroscopic substance; and cooking the blended mixture with water to form a paste.

7. Method of making the herein described paste adherent to oil permeated paper which comprises heating dried tapioca starch acidified to about pH equals 3.5 at 250° Fahrenheit for 15 to 18 hours; blending the resultant dextrine with borax and a hygroscopic substance; and cooking one part of the blended mixture with 2¾ parts of water for about 15 minutes at approximately 200° Fahrenheit.

8. Method of making the herein described paste adherent to oil permeated paper which comprises heating dried tapioca starch acidified to about pH equals 3.5 at 250° Fahrenheit for 15 to 18 hours; blending 1,000 parts of the resultant dextrine with 121 parts of borax and 22 parts of diethylene glycol; and cooking the blended mixture with water until a paste is formed.

9. Method of making the herein described compound for forming a paste adherent to oil permeated paper which comprises heating dried tapioca starch acidified to about pH equals 3.5 at 250° Fahrenheit for 15 to 18 hours; and blending 1,000 parts of the resultant dextrine with 121 parts of borax and 22 parts of diethylene glycol.

10. Method of making the herein described paste adherent to oil permeated paper which comprises drying tapioca starch to a moisture content of about 5%–6%; acidifying the starch to about pH equals 3.5; heating the starch to a temperature of about 520° Fahrenheit and holding the same at that temperature for about 15 to 18 hours; and blending 1,000 parts of the resultant dextrine with about 121 parts of borax and 22 parts of diethylene glycol.

11. Method of making the herein described paste adherent to oil permeated paper which comprises drying tapioca starch to a moisture content of about 5%–6%; acidifying the starch to about pH equals 3.5; heating the starch to a temperature of about 250° Fahrenheit and holding the same at that temperature for about 15 to 18 hours; blending 1,000 parts of the resultant dextrine with about 121 parts of borax and 22 parts of diethylene glycol; and cooking one part of the blended mixture with about 2¾ parts of water to form a paste.

12. Compound for making an adhesive paste which when cooked with water is capable of adhering to an oily surface composed of acidified dry roasted tapioca dextrine having characteristics substantially as follows: solubility 28%–35%; dextrose content under 3% and fluidity 23–26, blended with borax and diethylene glycol.

LOUIS K. WAKEMAN.

CERTIFICATE OF CORRECTION.

Patent No. 2,126,520.   August 9, 1938.

LOUIS K. WAKEMAN.

It is hereby certified that error appears in the printed specification of the above numbered patent requiring correction as follows: Page 2, first column, line 24, claim 10, for "520°" read 250°; and that the said Letters Patent should be read with this correction therein that the same may conform to the record of the case in the Patent Office.

Signed and sealed this 13th day of September, A. D. 1938.

Henry Van Arsdale (Seal)   Acting Commissioner of Patents.

one part of the blended mixture with 2¾ parts of water for about 15 minutes at approximately 200° Fahrenheit.

8. Method of making the herein described paste adherent to oil permeated paper which comprises heating dried tapioca starch acidified to about pH equals 3.5 at 250° Fahrenheit for 15 to 18 hours; blending 1,000 parts of the resultant dextrine with 121 parts of borax and 22 parts of diethylene glycol; and cooking the blended mixture with water until a paste is formed.

9. Method of making the herein described compound for forming a paste adherent to oil permeated paper which comprises heating dried tapioca starch acidified to about pH equals 3.5 at 250° Fahrenheit for 15 to 18 hours; and blending 1,000 parts of the resultant dextrine with 121 parts of borax and 22 parts of diethylene glycol.

10. Method of making the herein described paste adherent to oil permeated paper which comprises drying tapioca starch to a moisture content of about 5%–6%; acidifying the starch to about pH equals 3.5; heating the starch to a temperature of about 520° Fahrenheit and holding the same at that temperature for about 15 to 18 hours; and blending 1,000 parts of the resultant dextrine with about 121 parts of borax and 22 parts of diethylene glycol.

11. Method of making the herein described paste adherent to oil permeated paper which comprises drying tapioca starch to a moisture content of about 5%–6%; acidifying the starch to about pH equals 3.5; heating the starch to a temperature of about 250° Fahrenheit and holding the same at that temperature for about 15 to 18 hours; blending 1,000 parts of the resultant dextrine with about 121 parts of borax and 22 parts of diethylene glycol; and cooking one part of the blended mixture with about 2¾ parts of water to form a paste.

12. Compound for making an adhesive paste which when cooked with water is capable of adhering to an oily surface composed of acidified dry roasted tapioca dextrine having characteristics substantially as follows: solubility 28%–35%; dextrose content under 3% and fluidity 23–26, blended with borax and diethylene glycol.

LOUIS K. WAKEMAN.

CERTIFICATE OF CORRECTION.

Patent No. 2,126,520.                                                                  August 9, 1938

LOUIS K. WAKEMAN.

It is hereby certified that error appears in the printed specification of the above numbered patent requiring correction as follows: Page 2, first column, line 24, claim 10, for "520°" read 250°; and that the said Letters Patent should be read with this correction therein that the same may conform to the record of the case in the Patent Office.

Signed and sealed this 13th day of September, A. D. 1938.

Henry Van Arsdale (Seal)                                                Acting Commissioner of Patents.